(12) United States Patent
Kaddouh et al.

(10) Patent No.: US 10,967,801 B2
(45) Date of Patent: Apr. 6, 2021

(54) VEHICLE STEP MOUNTING ASSEMBLY

(71) Applicant: Nissan North America, Inc., Franklin, TN (US)

(72) Inventors: Sam Kaddouh, Grosse Pointe Park, MI (US); Josiah E. Wilson, III, New Orleans, LA (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 16/524,998

(22) Filed: Jul. 29, 2019

(65) Prior Publication Data

US 2021/0031696 A1 Feb. 4, 2021

(51) Int. Cl.
*B60R 3/00* (2006.01)
*B60R 3/02* (2006.01)
*B62D 33/02* (2006.01)

(52) U.S. Cl.
CPC ............... *B60R 3/02* (2013.01); *B62D 33/02* (2013.01)

(58) Field of Classification Search
CPC ............ B60R 3/02; B62D 33/03; B62D 33/02
See application file for complete search history.

(56) References Cited

U.S. PATENT DOCUMENTS

| | | | | |
|---|---|---|---|---|
| 4,021,071 A * | 5/1977 | Norman | ................ | B60R 3/02 296/62 |
| 4,217,971 A * | 8/1980 | Rivinius | ................ | B60R 3/02 182/2.7 |
| 7,637,519 B2 * | 12/2009 | Leitner | ................ | B60R 3/02 280/163 |
| 8,056,913 B2 * | 11/2011 | Kuntze | ................ | B60R 3/02 280/166 |
| 9,963,076 B1 * | 5/2018 | Bender | ................ | B62D 33/03 |
| 2003/0184040 A1 * | 10/2003 | Leitner | ................ | B60R 3/02 280/166 |
| 2009/0008894 A1 | 1/2009 | Kuntze et al. | | |
| 2012/0025485 A1 * | 2/2012 | Yang | ................ | B60R 3/02 280/166 |
| 2015/0123375 A1 * | 5/2015 | Leitner | ................ | B60R 3/02 280/166 |
| 2015/0329056 A1 * | 11/2015 | Leitner | ................ | B60R 3/02 280/166 |
| 2018/0126911 A1 | 5/2018 | Bender et al. | | |

* cited by examiner

*Primary Examiner* — Hau V Phan
(74) *Attorney, Agent, or Firm* — Global IP Counselors, LLP

(57) ABSTRACT

A vehicle step mounting assembly includes a vehicle frame member, a first mounting bracket and a retractable step assembly. The first mounting bracket is attached to the vehicle frame member, with the first mounting bracket being cantilevered from the vehicle frame member in an outboard direction. The retractable step assembly has a second mounting bracket and at least one step retraction link attached to an underside of the second mounting bracket. An upper side of the second mounting bracket is attached to the first mounting bracket.

19 Claims, 7 Drawing Sheets

VEHICLE STEP MOUNTING ASSEMBLY

BACKGROUND

Field of the Invention

The present invention generally relates to vehicle step mounting assembly. More specifically, the present invention relates to a vehicle step mounting assembly that includes orientation adjusting structures for customizing positioning of a retractable step assembly.

Background Information

Pickup trucks and various commercial vehicles sometimes include a step to assist a person climbing into a cargo area of the vehicle.

SUMMARY

One object of the present disclosure is to provide a vehicle step mounting assembly with mounting structure that facilitates orientation adjusting of a retractable step assembly supported by the mounting structure in order to customize positioning of the retractable step assembly.

In view of the state of the known technology, one aspect of the present disclosure is to provide a vehicle step mounting assembly with a vehicle frame member, a first mounting bracket and a retractable step assembly. The first mounting bracket is attached to the vehicle frame member, with the first mounting bracket being cantilevered from the vehicle frame member in an outboard direction. The retractable step assembly has a second mounting bracket and at least one step retraction link attached to an underside of the second mounting bracket. An upper side of the second mounting bracket is attached to the first mounting bracket.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
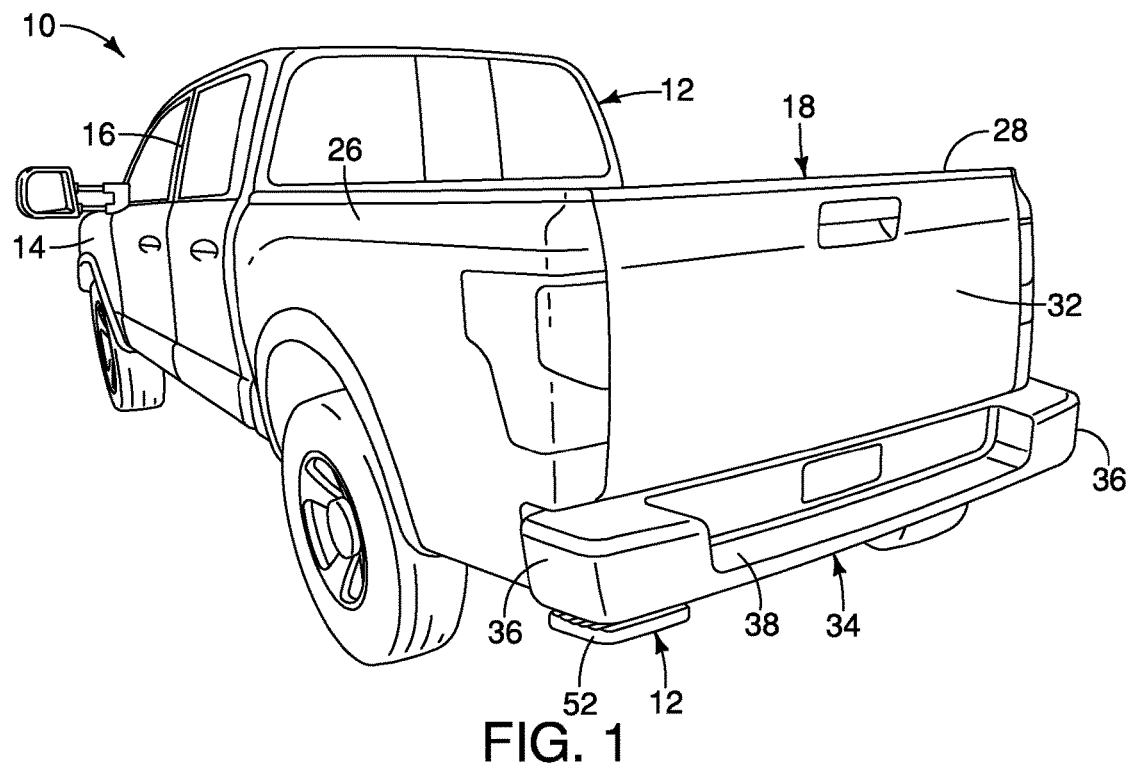
FIG. 1 is a perspective view of a vehicle that includes cargo area and a vehicle step mounting assembly that includes a step shown in a retracted or stowed orientation in accordance with an exemplary embodiment.
Figure 2:
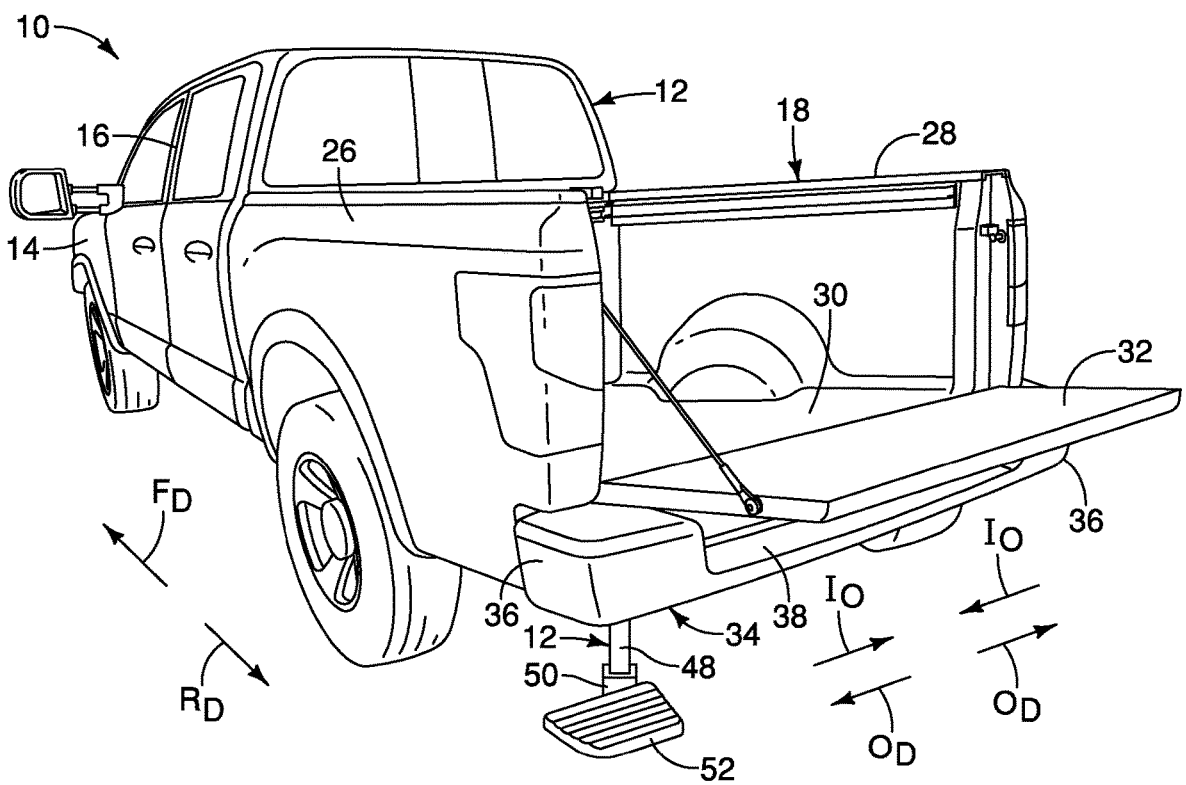
FIG. 2 is another perspective view of the vehicle similar to FIG. 1 showing the cargo area and the step of the vehicle step mounting assembly in an extended or in-use orientation in accordance with the exemplary embodiment.

Referring initially to FIGS. 1 and 2, a vehicle 10 having a vehicle step mounting assembly 12, is illustrated in accordance with a first embodiment.

The vehicle 10 includes an engine compartment area 14, a passenger compartment structure 16, a pickup truck cargo area 18 (hereinafter referred to as the cargo area 18) and a frame 20 (portions shown in FIGS. 3 and 4). The frame 20 includes a pair of side members 22 (only one side member 16 is partially shown in FIGS. 3 and 4). The side members 22 of the frame 14 each extend from beneath the engine compartment area 14, under the passenger compartment structure 16 to a location adjacent the rear end of the cargo area 18, as shown in FIGS. 3 and 4.

As shown in FIGS. 1 and 2, the vehicle 10 defines a plurality of directions, such as, a forward direction $F_D$, a rearward direction $R_D$, outboard directions $O_D$ and inboard directions $I_D$. The forward direction $F_D$ and the rearward direction $R_D$ are defined relative to the front and rear of the vehicle 10. The outboard directions $O_D$ and inboard directions $I_D$ defined relative to an imaginary center line (not shown) of the vehicle 10. Specifically, the outboard directions $O_D$ and inboard directions $I_D$ are side-to-side directions relative to the vehicle with the outboard directions $O_D$ being directions that extend away from the imaginary center line of the vehicle 10 and inboard directions $I_D$ being directions that extend toward from the imaginary center line of the vehicle 10.

The cargo area 18 includes side walls 26 and 28, a floor 30 (FIG. 2) and a tailgate 32. Rearward of the tailgate 32 is a bumper assembly 34 that is fixed to a rear end of the frame 20 in a conventional manner. The bumper assembly 34 includes side sections 36 and a central section 38 extending therebetween.

Figure 3:
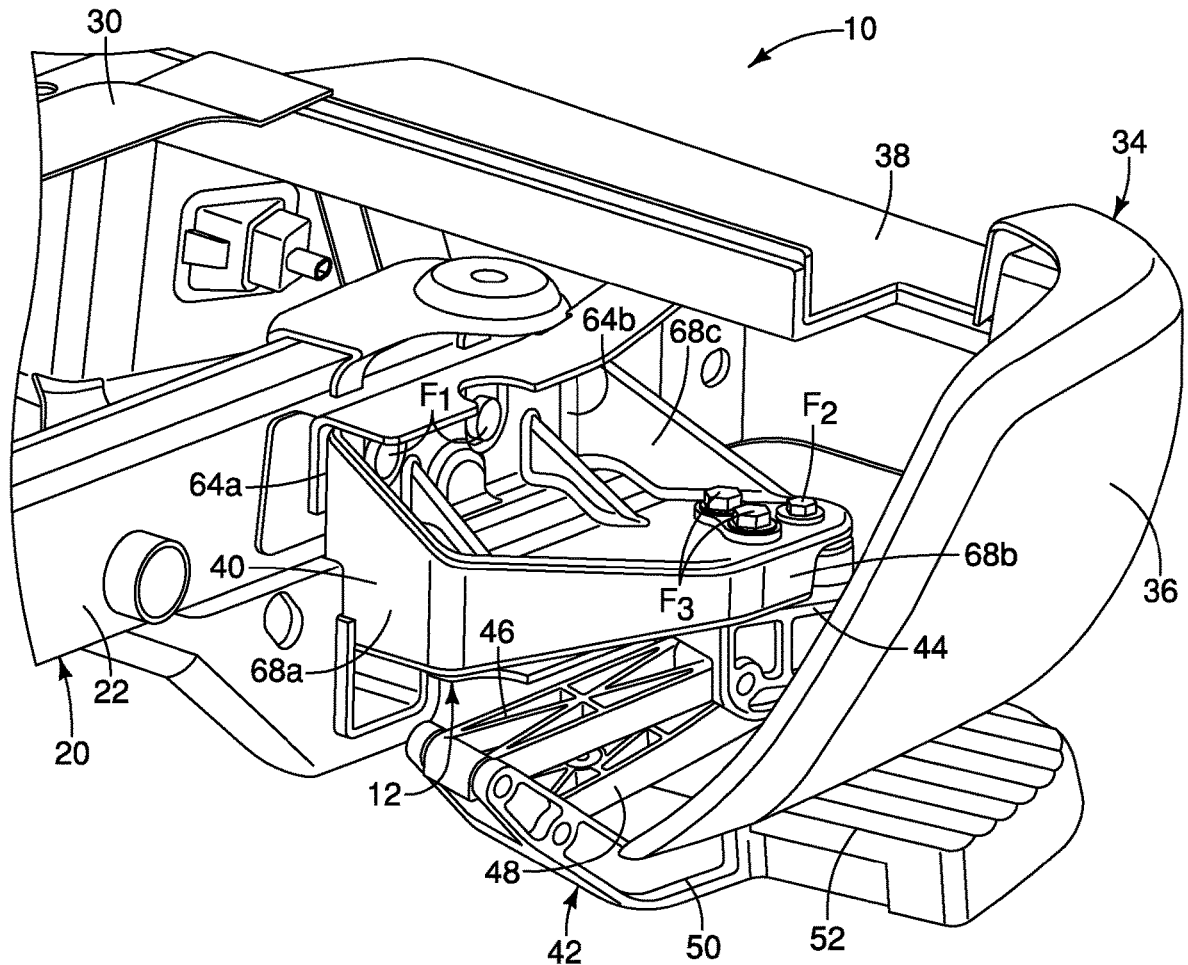
FIG. 3 is a perspective view of a rear corner of the vehicle with portions of the cargo area removed showing a first mounting bracket and a second mounting bracket of the vehicle step mounting assembly in accordance with the exemplary embodiment.
Figure 4:
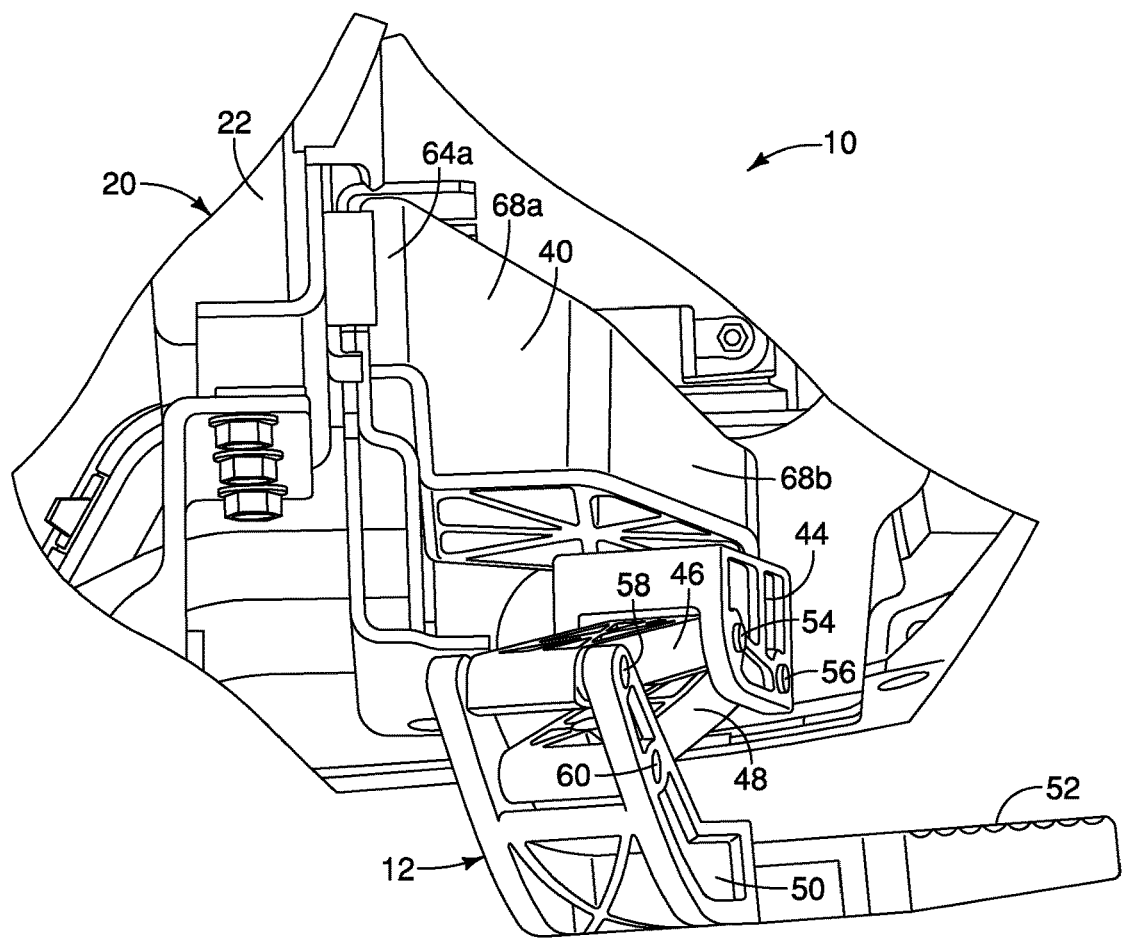
FIG. 4 is another perspective view of the rear corner of the vehicle showing the first mounting bracket and the second mounting bracket of the vehicle step mounting assembly in accordance with the exemplary embodiment.
Figure 5:
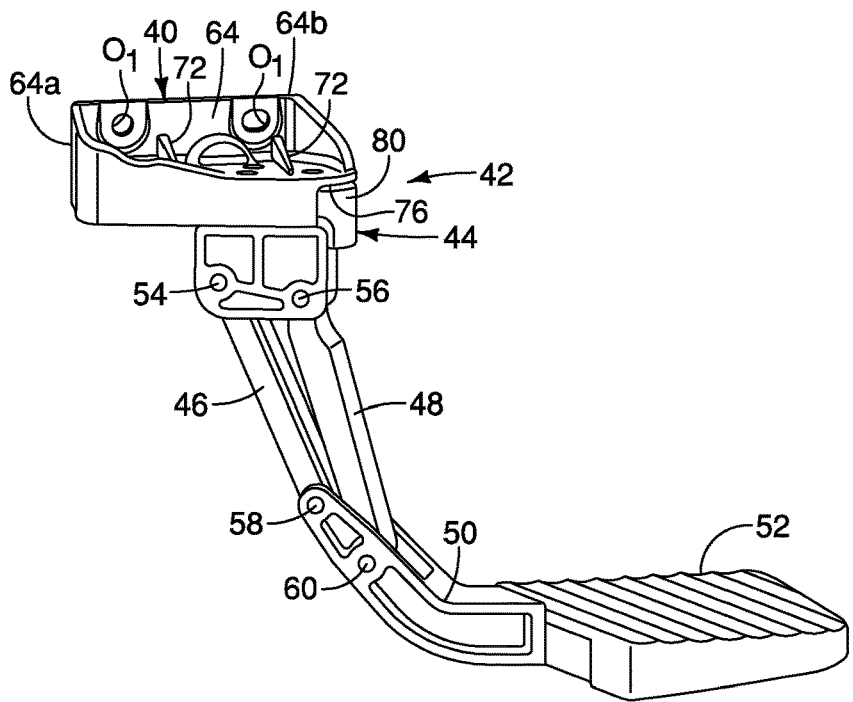
FIG. 5 is a perspective view of the vehicle step mounting assembly removed from the vehicle showing the first mounting bracket, the second mounting bracket, the step and links configured such that the step can move between the in-use orientation and the stowed orientation in accordance with the exemplary embodiment.

As shown in FIGS. 3, 4 and 5, the vehicle step mounting assembly 12 basically includes a first mounting bracket 40 and a retractable step assembly 42. The first mounting bracket 40 is attached to the side member 22 (herein after referred to as the vehicle frame member 22). The first mounting bracket 40 is further cantilevered from the vehicle frame member 22, extending in the outboard direction $O_D$ from the vehicle frame member 22. The first mounting bracket 40 is described in further detail below As shown in FIGS. 3, 4 and 5, the retractable step assembly 42 includes a second mounting bracket 44, a first link 46, a second link 48, and a lower link bracket 50 that includes a step 52 that extends from the lower link bracket 50. The lower link bracket 50 and the step 52 are rigidly and non-movably attached to one another or formed as a single member for movement as a single element. The step 52 of the retractable step assembly 12 is dimensioned to support only a single foot.

As shown in FIG. 4, a first end of the first link 46 is attached to the second mounting bracket 44 for pivoting movement about a first shaft 54. A first end of the second link 48 is attached to the second mounting bracket 44 for pivoting movement about a second shaft 56 that is vertically and horizontally spaced apart from the first shaft 54. Similarly, a second end of the first link 46 is attached to the lower link bracket 50 for pivoting movement about a third shaft 58. A second end of the second link 48 is attached to the lower link bracket 50 for pivoting movement about a fourth shaft 60 that is vertically and horizontally spaced apart from the third shaft 58. Further, as shown in FIG. 5, the second link 48 is longer than the first link 46.

A simple kinematic analysis of the retractable step assembly 42 shows that as the step 52 is moved (for example, manual actions taken by a vehicle operator), the step 52 remains approximately level or parallel to a generally horizontal plan during movement between a stowed orientation, as shown in FIG. 1, and an in-use orientation as shown in FIGS. 2 and 4. In the stowed orientation, the step 52 is located under one of the side sections 36 of the bumper assembly 34. As shown in FIG. 5, the step 52 extends generally in the rearward direction $R_D$ such that a person can step on to the step 52 in order to climb up into the cargo area 18 of the vehicle 10.

It should be understood from the drawings and the description herein that the retractable step assembly 42 described above can be replaced with any of a variety of retractable step assemblies. In other words, the specific design and kinematic relationships present in the retractable step assembly 42 is not required. In the depicted embodiment, any suitable configuration of links and step can be used with the first mounting bracket 40 and the second mounting bracket 44. Other link arrangements, kinematic relationships and step assembly designs can replace the retractable step assembly 42 described above.

A description is now provided for the first mounting bracket 40, with specific reference to FIGS. 6-13. The first mounting bracket 40 has an upright attachment flange 64, a base section 66 and side flanges 68a, 68b and 68c. The base section 66 is formed with or fixedly attached to the upright attachment flange 64 and is cantilevered therefrom. The base section 66 includes an upper side 66a (FIGS. 7, 8, 9 and 11), and an underside 66b (a lower surface 66b) shown in FIGS. 10 and 13. With the first mounting bracket 40 of the vehicle step mounting assembly 12 attached to the side member 22 (as shown in FIG. 3), the base section 66 of the first mounting bracket 40 extends in an overall horizontal outboard direction $O_D$ from the upright attachment flange 64 to a distal edge 40a of the first mounting bracket 40. As shown in FIGS. 3 and 4, the upright attachment flange 64 is fixed to an upright outboard surface of the side member 22 and is at least partially concealed behind the side section 36 of the bumper assembly 34 adjacent the rear end of the cargo area 18. Hence, the first mounting bracket 40 is cantilevered in an outboard direction $O_D$ from the side member 22.

Figure 6:
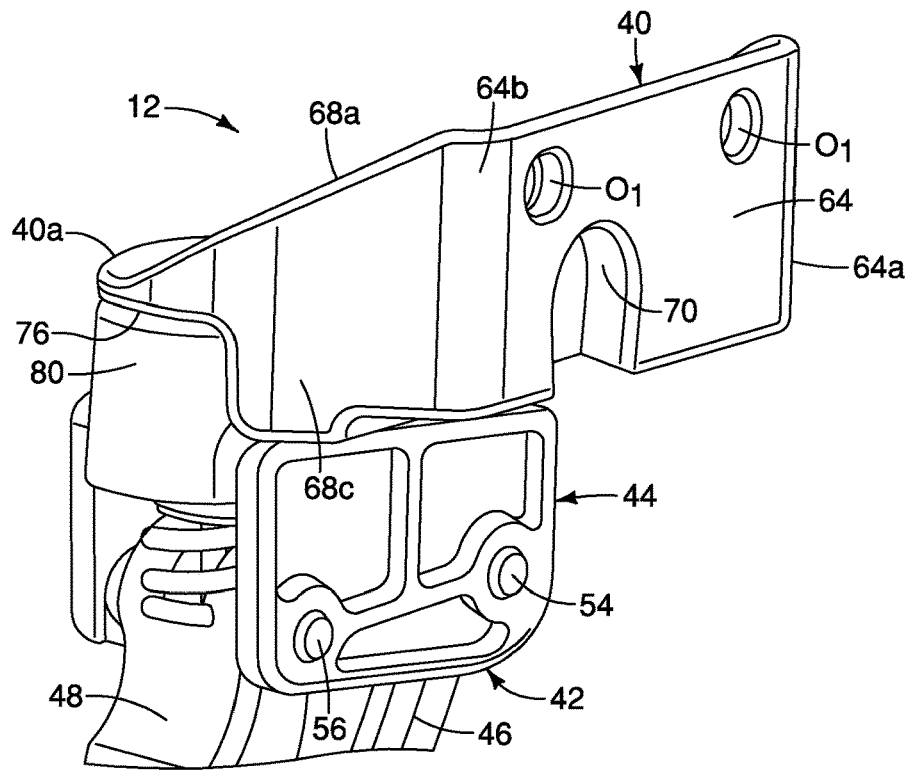
FIG. 6 is a perspective view of a portion of the vehicle step mounting assembly removed from the vehicle showing an inboard surface of the first mounting bracket and details of the second mounting bracket in accordance with the exemplary embodiment.
Figure 7:
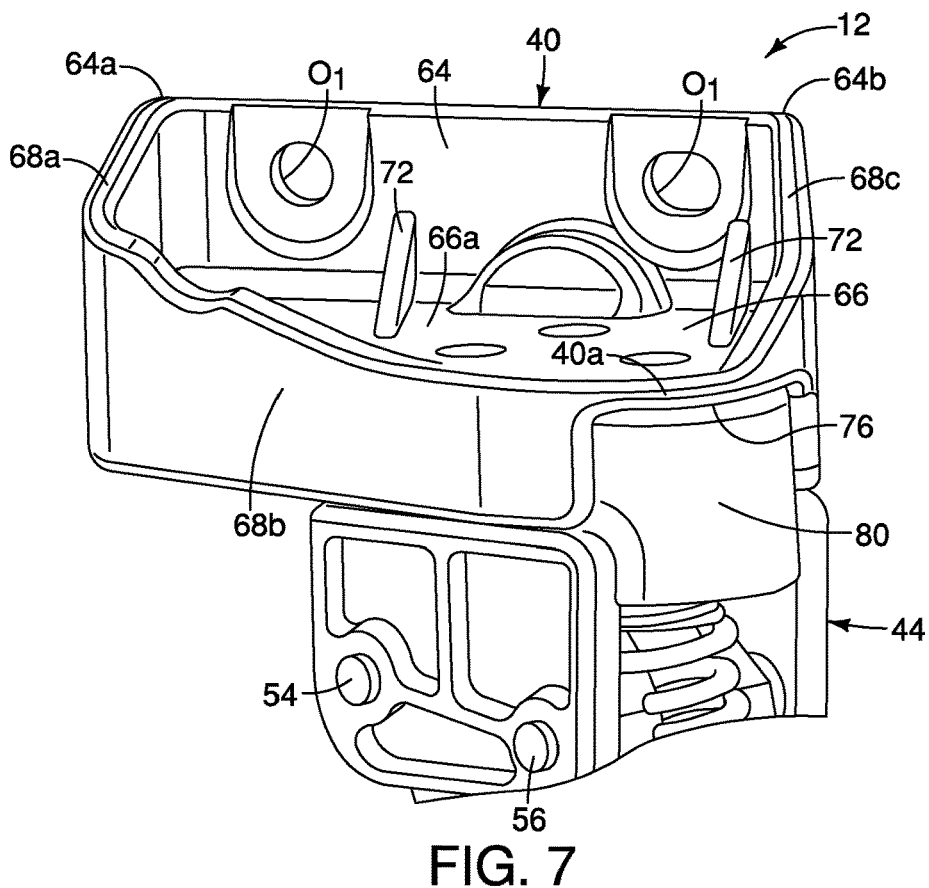
FIG. 7 is another perspective view of the portion of the vehicle step mounting assembly depicted in FIG. 6 showing outboard surfaces of the first mounting bracket and further details of the second mounting bracket and links of the retractable step assembly in accordance with the exemplary embodiment.
Figure 8:
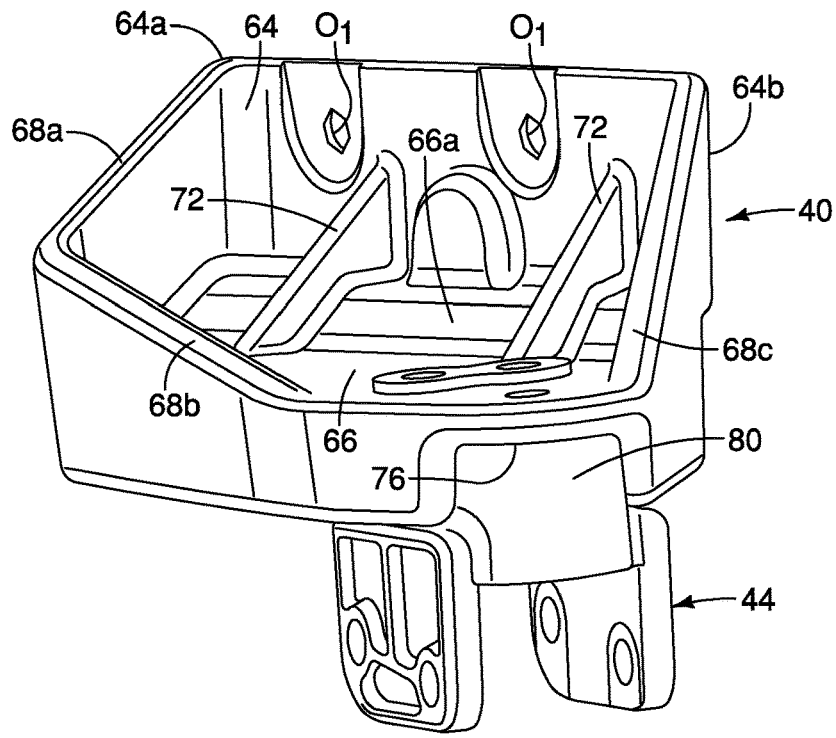
FIG. 8 is another perspective view of the portion of the vehicle step mounting assembly depicted in FIGS. 6 and 7 showing the outboard surfaces of the first mounting bracket and the second mounting bracket with the links removed therefrom in accordance with the exemplary embodiment.
Figure 9:
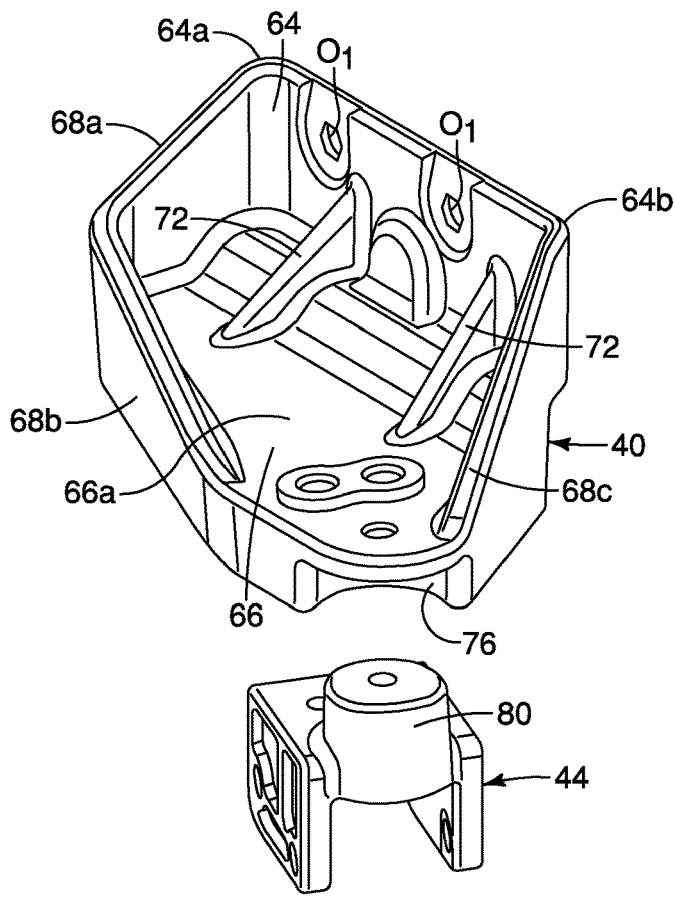
FIG. 9 is an exploded perspective view of the portion of the vehicle step mounting assembly depicted in FIGS. 6, 7 and 8 showing details of the first mounting bracket separated from the second mounting bracket and showing an upwardly extending projection of the second mounting bracket with the links removed therefrom in accordance with the exemplary embodiment.

As shown in FIGS. 5-12, the upright attachment flange 64 basically a flat plate-like portion of the first mounting bracket 40. The upright attachment flange 64 includes a pair of fastener receiving openings $O_1$ and $O_2$ that are spaced apart from one another. An inboard surface of the upright attachment flange 64, as shown in FIG. 6, is generally flat except that a recessed area 70 is formed therein. The recessed area 70 is dimensioned to fit over a fastener (not shown) that can be installed to the outboard surface of the side member 22, such that when the first mounting bracket 40 is installed to the side member 22 of the frame 20, the first mounting bracket 40 fits flat against the outboard surface of the side member 22. As shown in FIGS. 7-9 and 11, an outboard surface of the upright attachment flange 64 is generally flat, but can include various recessed depressions that receive heads of fasteners $F_1$ (shown in FIG. 3) that fix the first mounting bracket 40 to the outboard surface of the side member 22. The outboard surface of the upright attachment flange 64 can also include a pair of reinforcing ribs 72 that extend in the outboard direction $O_D$ along the upper side 66a of the base section 66.

Figure 10:
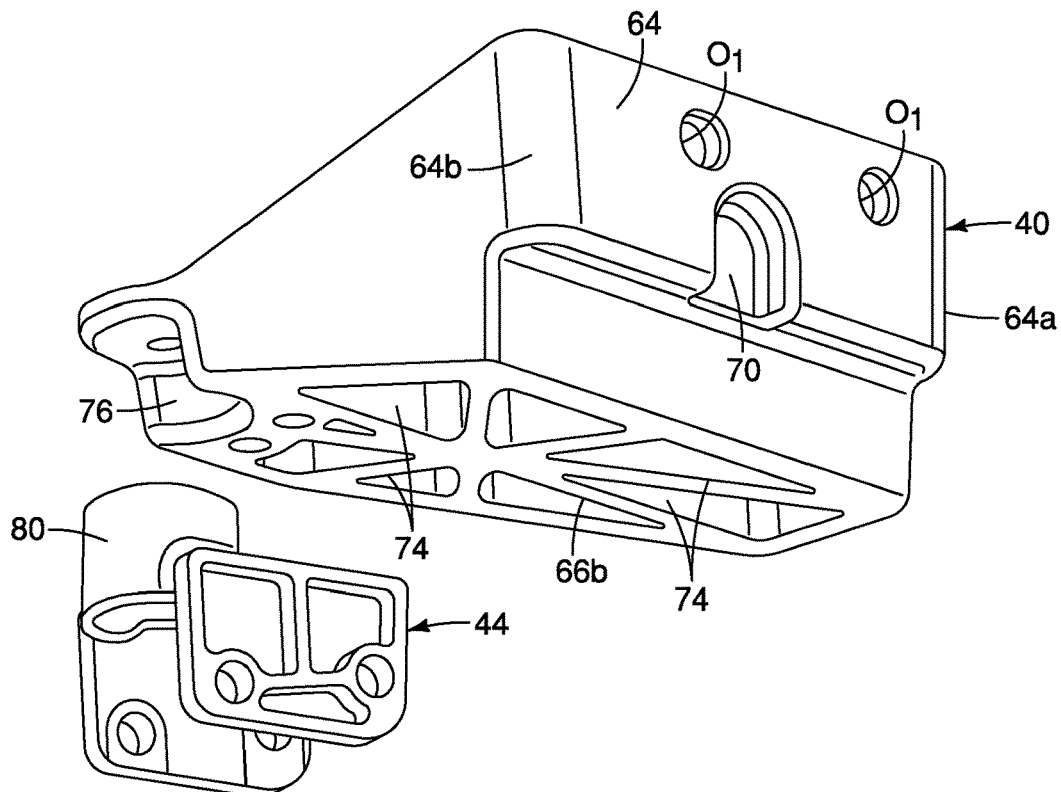
FIG. 10 is another exploded perspective view of the portion of the vehicle step mounting assembly depicted in FIGS. 6-9 showing the inboard surface of the first mounting bracket separated from the second mounting bracket and showing further details of the second mounting bracket with the links removed therefrom in accordance with the exemplary embodiment.
Figure 11:
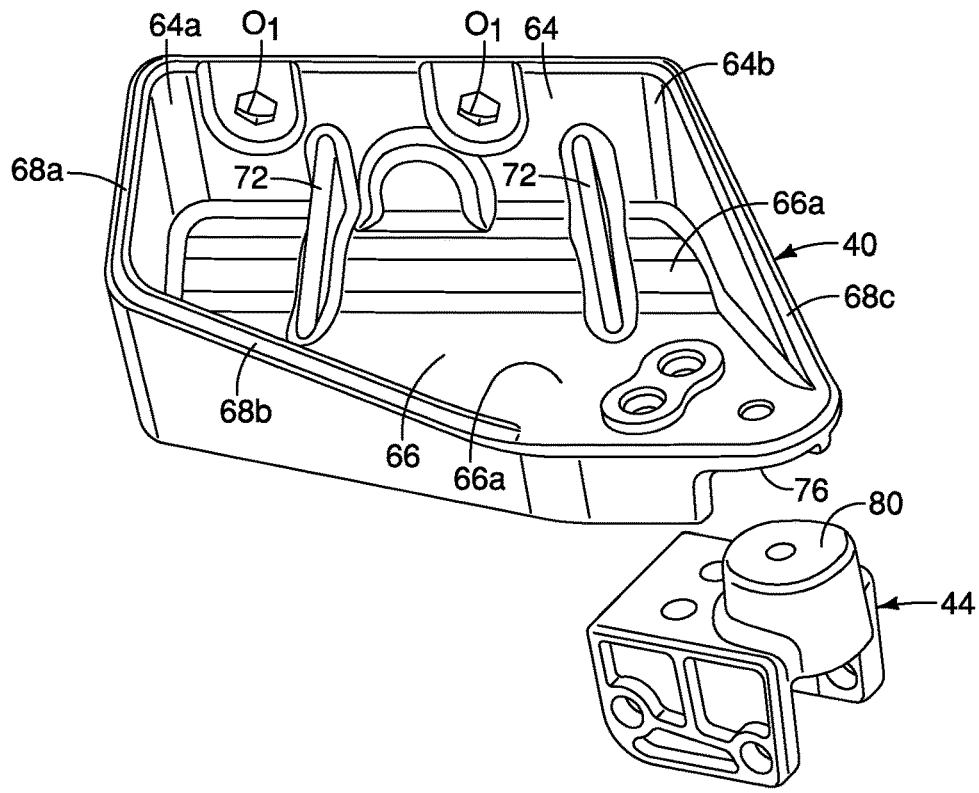
FIG. 11 is still another exploded perspective view of the portion of the vehicle step mounting assembly depicted in FIGS. 6-10 showing outboard surfaces of the first mounting bracket separated from the second mounting bracket and showing further details of the upwardly extending projection of the second mounting bracket with the links removed therefrom in accordance with the exemplary embodiment.
Figure 12:
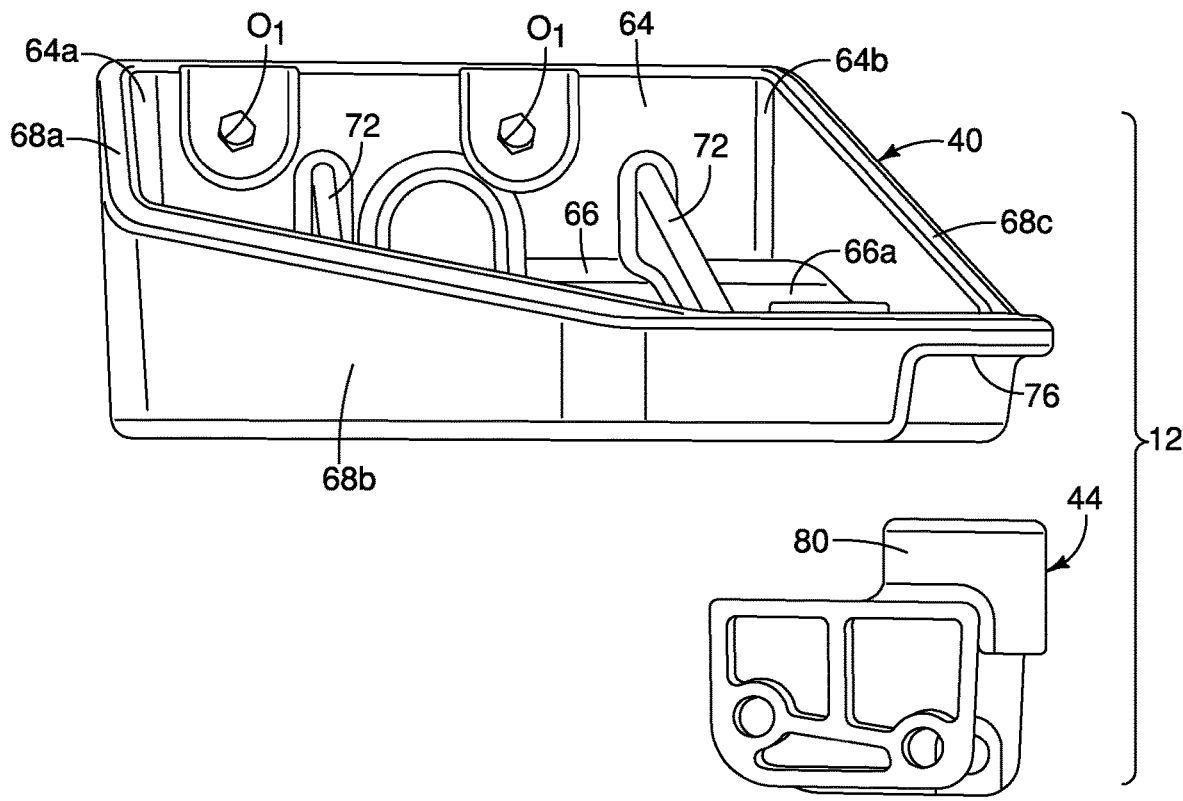
FIG. 12 is an exploded side view of the portion of the vehicle step mounting assembly depicted in FIGS. 6-11 showing the outboard surfaces of the first mounting bracket separated from the second mounting bracket and showing further details of the second mounting bracket with the links removed therefrom in accordance with the exemplary embodiment.
Figure 13:
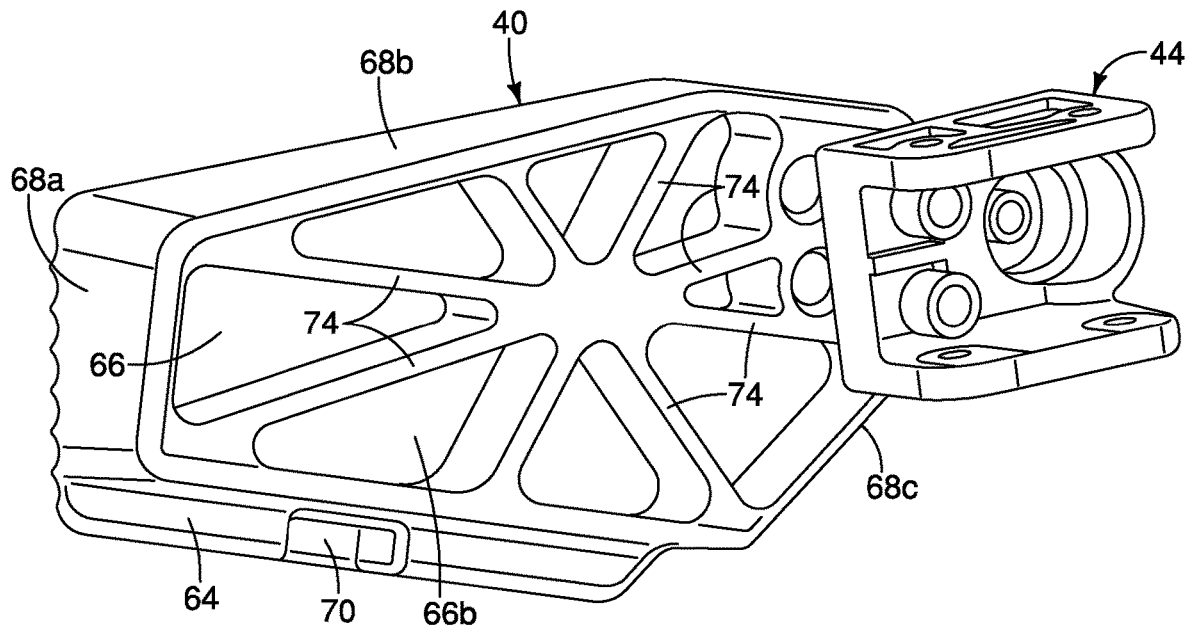
FIG. 13 is a perspective view of the portion of the vehicle step mounting assembly depicted in FIGS. 6-12 showing underside surfaces of the first mounting bracket and the second mounting bracket with the links removed therefrom in accordance with the exemplary embodiment.

As shown in FIGS. 10 and 12, the underside 66b of the base section 66, includes a plurality of ribs 74 and a recessed area 76. The plurality of ribs 74 are configured and shaped to provide strength and rigidity to the first mounting bracket 40. The recessed area 76 has an overall circular shape, as shown in FIGS. 8 thru 11.

The base section 66 of the first mounting bracket 40 further includes the side flanges 68a, 68b and 68c. As shown in FIGS. 7-9 and 11, together, the side flanges 68a, 68b and 68c wrap around three sides of the base section 66 from a forward end 64a of the upright attachment flange 64 to a rearward end 64b of the upright attachment flange 64. Specifically, the side flange 68a approximately extends in the outboard direction $O_D$ from the forward end 64a to the side flange 68b. The side flange 68a further extends upward from the upper side 66a of the base section 66. As the side flange 68a extends in the outboard direction $O_D$, the height of the side flange 68a decreases. The side flange 68b turns in the rearward direction $R_D$ and decreases in height extending toward the side flange 68c. As the side flange 68c extends in the outboard direction $O_D$, the height of the side flange 68c decreases. Along the upper side 66a of the base section 66, the side flange 68a and 68b are continuous. However, there can be a gap between the side flange 68b and 68c.

Along the underside surface 66b of the base section 66, the side flange 68a, the side flange 68b, the side flanges 68c all extend downward having the same downward height as measured from the underside surface 66b to respective lower edges of each of the side flange 68a, the side flange 68b, the side flanges 68c. Further, along the underside surface 66b, the side flanges 68a and 68b are continuous (no gaps). However, along the underside surface 66b, there is a gap between the side flanges 68b and 68c that coincides with the recessed area 76. The downward height of each of the side flanges 68a, 68b and 68c is the same as the downward height of the ribs 74. The gap between the side flanges 68b and 68c that coincides with the recessed area 76 defines a distal edge of the first mounting bracket 40.

In the depicted embodiment, the base section 66, the side flanges 68a, 68b and 68c, the ribs 74 and the upright attachment flange 64 are all formed as a single unitary, monolithic element.

The second mounting bracket 44 of the retractable step assembly 42 includes an upwardly extending projection 80. The upwardly extending projection 80 has a cylindrical, annular or circular shape and is dimensioned to fit within the recessed area 76 of the first mounting bracket 40. The second mounting bracket 44 is attached to the first mounting bracket 40 via a mechanical fastener $F_2$ (FIG. 3) that is centered relative to the overall circular shape of the recessed area 76 of the first mounting bracket 40 and centered relative to the overall circular shape of the upwardly extending projection 80 of the second mounting bracket 44. The second mounting bracket 44 is further attached to the first mounting bracket 40 via mechanical fasteners $F_3$. The mechanical fasteners $F_3$ are off center and threaded into openings in the base section 66 of the first mounting bracket 40 and corresponding openings in the second mounting bracket 44. Once tightened, the mechanical fasteners $F_3$ non-movably fix the first mounting bracket 40 to the second mounting bracket 44. Once installed and tightened, the fasteners $F_2$ and $F_3$ further fix the orientation of the retractable step assembly 42 relative to the pickup truck cargo area 18 of the vehicle 10.

In the depicted embodiment, the retractable step assembly 42 is oriented such that the step 52 moves rearward and is located rearward of the bumper assembly 34 when in the in-use orientation, as shown in FIG. 2. Since the recessed area 76 of the first mounting bracket 40 and the upwardly extending projection 80 of the second mounting bracket 44, with only the mechanical fastener $F_2$ installed, the retractable step assembly 42 and the second mounting bracket 44 can be pivoted relative to the first mounting bracket 40 to any of a variety of orientations (pivoted about an axis defined by the mechanical fastener $F_2$). Specifically, once a vehicle appropriate orientation has been determined, threaded openings in the second mounting bracket 44 can be drilled and threaded to receive the mechanical fasteners $F_3$ thereby locking the retractable step assembly 42 and the second mounting bracket 44 in position. For example, in the depicted embodiment, the retractable step assembly 42 and the second mounting bracket 44 are oriented and located such that the step 52 is rearward of the bumper assembly 34 when in the in-use orientation. In some vehicles, it may be desirable for the retractable step assembly 42 and the second mounting bracket 44 to be oriented such that the step 52 extends in an outboard direction when in the in-use orientation. In yet another vehicle application, perhaps the retractable step assembly 42 and the second mounting bracket 44 are desired to be oriented with the step 52 angled 45 degrees relative to each of the outboard direction $O_D$ and the rearward direction $R_D$ when in the in-use orientation.

The shapes and configurations of each of the first mounting bracket 40 and the second mounting bracket 44 provide a flexible way to install and orient the vehicle step mounting assembly 12.

The various elements and components of the vehicle 10, other than the vehicle step mounting assembly 12, are conventional components that are well known in the art. Since such elements and components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle step mounting assembly. Accordingly, these terms, as utilized to describe the present invention should be interpreted relative to a vehicle equipped with the vehicle step mounting assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle step mounting assembly, comprising:
   a vehicle frame member;
   a first mounting bracket attached to the vehicle frame member, with the first mounting bracket being cantilevered from the vehicle frame member in an outboard direction, the first mounting bracket having a recessed area along an underside thereof; and
   a retractable step assembly having a second mounting bracket and at least one step retraction link attached to an underside of the second mounting bracket, with an upper side of the second mounting bracket being attached to the first mounting bracket, the upper side of the second mounting bracket including an upwardly extending projection dimensioned to fit within the recessed area of the first mounting bracket, the upwardly extending projection and the second mounting bracket being non-movable relative to one another once the second mounting bracket is fully installed to the first mounting bracket, the upwardly extending projection and the second mounting bracket being fixed to the first mounting bracket via a first mechanical fastener.

2. The vehicle step mounting assembly according to claim 1, wherein
   the recessed area of the first mounting bracket has an overall circular shape and the upwardly extending projection of the second mounting bracket has an overall circular shape.

3. The vehicle step mounting assembly according to claim 2, wherein
   the second mounting bracket is attached to the first mounting bracket via the first mechanical fastener which is centered relative to the overall circular shape of the recessed area of the first mounting bracket and the overall circular shape of the upwardly extending projection of the second mounting bracket.

4. The vehicle step mounting assembly according to claim 3, wherein
   the second mounting bracket is further attached to the first mounting bracket and fixed in position relative thereto via a second mechanical fastener spaced apart from the first mechanical fastener.

5. The vehicle step mounting assembly according to claim 3, wherein
   the upwardly extending projection of the second mounting bracket is rotatable within the recessed area of the first mounting bracket about the first mechanical first fastener that attaches the second mounting bracket to the first mounting bracket such that the second mounting bracket can be pivoted relative to the first mounting bracket to any of a variety of orientations thereby positioning the second mounting bracket in a vehicle appropriate orientation such that a second mechanical fastener that extends through the first mounting bracket and the upwardly extending projection adjacent to the first mechanical fastener retains the second mounting bracket in the vehicle appropriate orientation, with the second mounting bracket is fully installed to the first mounting bracket upon installation of the second mechanical fastener.

6. The vehicle step mounting assembly according to claim 1, wherein
   the first mounting bracket includes an upright attachment flange that overlays an outboard surface of the vehicle frame member with the first mounting bracket fixed to the vehicle frame member.

7. The vehicle step mounting assembly according to claim 6, wherein
   the first mounting bracket includes a base section that extends in an overall horizontal outboard direction from the upright attachment flange to a distal edge of the first mounting bracket.

8. The vehicle step mounting assembly according to claim 7, wherein
   the first mounting bracket includes a forward upright flange and a rearward upright flange.

9. The vehicle step mounting assembly according to claim 8, wherein
   the base section, the upright attachment flange, the forward upright flange and the rearward upright flange are all formed as a single unitary, monolithic element.

10. The vehicle step mounting assembly according to claim 8, wherein
    the rearward upright flange extends from the upright attachment flange to a location adjacent but spaced apart from the distal edge of the first mounting bracket.

11. The vehicle step mounting assembly according to claim 8, wherein
    the forward upright flange extends from the upright attachment flange to and along the distal edge of the first mounting bracket.

12. The vehicle step mounting assembly according to claim 7, wherein
    the base section of the first mounting bracket defines a lower surface that includes a plurality of ribs configured to provide strength and rigidity to the first mounting bracket.

13. The vehicle step mounting assembly according to claim 1, wherein
    the retractable step assembly is dimensioned to support only a single foot.

14. The vehicle step mounting assembly according to claim 1, wherein
    the first mounting bracket is attached to an outboard surface of the vehicle frame member.

15. A vehicle step mounting assembly, comprising:
    a first mounting bracket configured for attachment to a vehicle frame member, the first mounting bracket having a recessed area along an underside thereof; and
    a retractable step assembly having a second mounting bracket and at least one step retraction link attached to an underside of the second mounting bracket, with an upper side of the second mounting bracket being attached to the first mounting bracket, the second mounting bracket including an upwardly extending projection dimensioned to fit within the recessed area of the first mounting bracket,
    wherein the upwardly extending projection of the second mounting bracket is rotatable within the recessed area of the first mounting bracket about a first mechanical fastener that attaches the second mounting bracket to the first mounting bracket such that the second mounting bracket can be pivoted relative to the first mounting bracket to any of a variety of orientations thereby positioning the second mounting bracket in a vehicle appropriate orientation such that a second mechanical fastener that extends through the first mounting bracket and the upwardly extending projection adjacent to the first mechanical fastener retains the second mounting bracket in the vehicle appropriate orientation.

16. The vehicle step mounting assembly according to claim 15, wherein
the first mounting bracket includes an upright attachment flange dimensioned and shaped to overlay an outboard surface of the vehicle frame member.

17. The vehicle step mounting assembly according to claim 16, wherein
the first mounting bracket includes a base section that extends in an overall horizontal outboard direction from the upright attachment flange to a distal edge of the first mounting bracket, and, the first mounting bracket includes a forward upright flange and a rearward upright flange.

18. The vehicle step mounting assembly according to claim 17, wherein
the base section, the upright attachment flange, the forward upright flange and the rearward upright flange are all formed as a single unitary, monolithic element.

19. The vehicle step mounting assembly according to claim 15, further comprising
a vehicle frame member having an outboard surface, with the first mounting bracket being attached to the outboard surface of the vehicle frame member.

* * * * *